(12) United States Patent
Gwennap (10) Patent No.: US 10,167,007 B2
(45) Date of Patent: Jan. 1, 2019

(54) GAME CART APPARATUS AND METHODS

(71) Applicant: MAINSTREAM HOLDINGS, INC., Windom, MN (US)

(72) Inventor: Cord M. Gwennap, Bennington, KS (US)

(73) Assignee: Mainstream Holdings, Inc., Windom, MN (US)

( * ) Notice: Subject to any disclaimer, the term of this patent is extended or adjusted under 35 U.S.C. 154(b) by 0 days.

(21) Appl. No.: 14/882,371

(22) Filed: Oct. 13, 2015

(65) Prior Publication Data

US 2017/0101121 A1    Apr. 13, 2017

(51) Int. Cl.
  *B62B 3/02* (2006.01)
  *B62B 5/02* (2006.01)
(52) U.S. Cl.
  CPC .............. *B62B 5/026* (2013.01); *B62B 3/02* (2013.01); *B62B 2202/42* (2013.01)
(58) Field of Classification Search
  CPC ........... B62B 5/026; B62B 5/028; B62B 1/02; B62B 2202/42
  See application file for complete search history.

(56) References Cited

U.S. PATENT DOCUMENTS

| | | | | |
|---|---|---|---|---|
| 1,679,885 A * | 8/1928 | Walker | .................... | B62B 5/026 280/10 |
| 2,400,824 A * | 5/1946 | Jackson | .................. | B62B 5/026 180/65.6 |
| 2,706,640 A * | 4/1955 | Marshall | ................. | B62B 5/026 280/5.26 |
| 2,736,564 A * | 2/1956 | Loam | ...................... | B62B 5/026 16/18 B |
| 2,747,883 A * | 5/1956 | Frost | ....................... | B62B 5/026 280/47.27 |
| 3,058,754 A * | 10/1962 | Whitaker | ................ | B62B 5/026 280/5.26 |

(Continued)

OTHER PUBLICATIONS

Yukon Tracks Caribou ATV Trailer, http://www.sportsmansguide.com/product/index/yukon-tracks-caribou-atv-trailer?a=524419, Accessed Dec. 20, 2016.

(Continued)

*Primary Examiner* — Joseph M Rocca
*Assistant Examiner* — Michael R Stabley
(74) *Attorney, Agent, or Firm* — Stinson Leonard Street LLP (57) ABSTRACT

Cart apparatuses and related methods are described that are configured to traverse uneven terrain while carrying heavy loads such as game animals or equipment. In one example, the cart has a frame that has a handle structure and at least one cargo support portion. At least one wheel support assembly is configured to pivot around an axle connected to the frame. A first wheel and a second wheel may also be included, with the first and second wheels each being pivotable relative to the at least one wheel support assembly. The first wheel may have a first axis of rotation offset from and parallel to the axle, and the second wheel may have a second axis of rotation offset from and parallel to the axle. These carts and methods may make travel through uneven terrain and wilderness areas faster and more conveniently for outdoorsmen.

15 Claims, 11 Drawing Sheets

(56) References Cited

U.S. PATENT DOCUMENTS

| | | | | | |
|---|---|---|---|---|---|
| 3,450,219 | A | * | 6/1969 | Fleming | B62B 5/026 180/8.2 |
| 3,920,255 | A | * | 11/1975 | Siddoway | B62B 5/026 280/47.31 |
| 4,142,732 | A | * | 3/1979 | Boyd | B62B 5/026 188/22 |
| 4,312,417 | A | * | 1/1982 | Dalton | A61G 5/061 180/8.2 |
| 4,421,189 | A | * | 12/1983 | Watkins | A61G 5/061 180/8.2 |
| 4,457,526 | A | * | 7/1984 | Persson | B62B 5/026 280/5.26 |
| 4,906,014 | A | * | 3/1990 | Nanzai | B62B 1/08 280/47.2 |
| 4,993,912 | A | * | 2/1991 | King | B62D 61/12 180/8.2 |
| 5,273,296 | A | * | 12/1993 | Lepek | A61G 5/061 180/8.2 |
| 7,011,171 | B1 | * | 3/2006 | Poulter | B60B 15/023 180/65.1 |
| 7,516,503 | B1 | * | 4/2009 | Larson | A61G 1/0293 280/47.131 |
| 7,631,380 | B1 | * | 12/2009 | Larson | A61G 1/0293 280/47.131 |
| 7,784,569 | B2 | * | 8/2010 | Cheng | A61G 5/046 180/41 |
| 8,641,059 | B2 | * | 2/2014 | Khodor | B62B 1/12 280/47.28 |
| 8,702,108 | B2 | * | 4/2014 | Zanderlehn | A61G 5/061 180/209 |
| 2005/0087940 | A1 | * | 4/2005 | Ally | B62B 5/026 280/5.26 |
| 2007/0075509 | A1 | * | 4/2007 | Wyrick, III | B62B 5/026 280/47.27 |
| 2008/0007015 | A1 | * | 1/2008 | Bidzhiev | B62B 5/026 280/5.26 |
| 2008/0018166 | A1 | * | 1/2008 | Chang | B62B 5/026 301/5.23 |
| 2008/0164665 | A1 | * | 7/2008 | Chang | B62B 5/026 280/5.28 |
| 2008/0238003 | A1 | * | 10/2008 | Burkard | B62B 1/10 280/5.32 |
| 2010/0026080 | A1 | * | 2/2010 | Colchiesqui | B62B 5/026 301/5.23 |
| 2010/0294575 | A1 | * | 11/2010 | Martel | A61G 5/061 180/8.2 |
| 2012/0292889 | A1 | * | 11/2012 | Khodor | B62B 1/12 280/651 |
| 2013/0184917 | A1 | * | 7/2013 | Sarokhan | B62B 5/0036 701/22 |

OTHER PUBLICATIONS

Agri-Fab ATV Tandem Axle Cart, http://www.northerntool.com/shop/tools/product_200269924_200269924?cm_mmc=Google-pla&utm_source=Google_PLA&utm_medium=Lawn%20%2B%20Garden%20%3E%20Lawn%20%2B%20Garden%20Utility%20Trailers&utm_campaign=Agri-Fab&utm_content=250820&gclid=CjwKEAiAvs7CBRC24rao6bGCoiASJABaCt5D2_nOECvDSIcpjNeRkn8hoXKCcxCtg7taqOe1UZGMhBoCyHjw_wcB, Accessed Dec. 20, 2016.

* cited by examiner

GAME CART APPARATUS AND METHODS

CROSS REFERENCE TO RELATED APPLICATIONS

This application claims benefit and priority of Provisional U.S. Patent Application No. 63/122,253, filed 1 Nov. 2014 and entitled HUNTING CART WITH WALKING AXLES, the disclosure of which is incorporated, in its entirety, by this reference.

TECHNICAL FIELD

The present disclosure generally relates to utility carts drawn by hand or by small vehicles to transport cargo across uneven terrain, and specifically relates to carts having walking axles that may dramatically reduce the work load of a user.

BACKGROUND

Sportsmen frequently hunt game animals in remote areas where roads, trails, and other cleared paths are distant or not well maintained. When an animal is downed deep within wooded, rocky, or mountainous terrain, the sportsman must exert great effort to transport the animal from the wilderness back to a vehicle, cabin, or other destination from which the animal can be more easily moved. Many game animals are often large and heavy, so dragging or carrying the animal is difficult and unwieldy even after field dressing.

To address these issues, sporting equipment providers have developed relatively lightweight wheeled hand carts that can be carried or otherwise transported into the wilderness. For example, a cart may be collapsible and made of tubular frame members for easier transport. When needed, the cart may be assembled or unfolded and may then be used to support an animal's body or other hunting equipment as the sportsman pulls it back from the hunt. These carts save considerable effort but have difficulty traversing rough terrain. Usually, the carts have little or no suspension and have rigid axles, similar to a wheeled hand truck or dolly. This design helps to limit the weight, size, and cost of the cart, but it also makes it burdensome to get the cart and animal over rocks, logs, ditches, and other common obstacles in the wilderness. As a result, obstacles may cause the cart to get stuck or cause the load to tip over, and the sportsman may have to counter-productively take longer and more time-consuming routes to reach his or her destination to avoid getting the cart stuck. Additionally, most hunting or utility carts have one- or two-wheeled designs with large wheels and a high center of gravity. This may cause issues when traveling over rough terrain since they are easily tipped over or put high stress on the wheels, causing them to break.

There is therefore a need for improvements in off-road transportation equipment, particularly for carts that may be used to transport game or other heavy loads after a hunt.

SUMMARY

One aspect of the present disclosure relates to a cart configured to traverse uneven terrain. The cart may comprise a frame, with the frame comprising a handle structure at a proximal end of the frame and at least one cargo support portion positioned distal to the handle structure. At least one wheel support assembly may be configured to pivot around an axle connected to the frame. A first wheel and a second wheel may also be included, with the first and second wheels each being pivotable relative to the at least one wheel support assembly. The first wheel may have a first axis of rotation offset from and parallel to the axle, and the second wheel may have a second axis of rotation offset from and parallel to the axle.

In some embodiments, the frame may comprise a first portion proximally extending from the axle and a second portion distally extending from the axle, wherein the first and second portions extend from the axle at an angle relative to each other. The respective axes of rotation of the first and second wheels may also extend through opposite ends of the at least one wheel support assembly. A second axle may connect the first wheel to the at least one wheel support assembly and a third axle may connect the second wheel to the at least one wheel support assembly. The axle may extend through a midsection of the at least one wheel support assembly. A plurality of load support elements may extend across the frame at the cargo support portion. The at least one cargo support portion may be positioned between the axle and the handle structure. Pivoting the at least one wheel support assembly relative to the axle may move the second wheel vertically over the first wheel. The first and second axes of rotation may be offset relative to each other.

Another aspect of the disclosure is a cart having multi-axis rotatable wheels, which comprises a frame apparatus, with the frame apparatus comprising at least one grippable portion, a first wheel assembly pivotally attached to a first side of the frame apparatus, with the first wheel assembly comprising a first end and a second end, a first wheel being attached to the first end of the first wheel assembly, and a second wheel being attached to the second end of the first wheel assembly, and a second wheel assembly pivotally attached to a second side of the frame apparatus, with the second wheel assembly comprising a first end and a second end, a third wheel being attached to the first end of the second wheel assembly, and a fourth wheel being attached to the second end of the second wheel assembly.

In this cart, the first wheel assembly may be rotatable relative to the second wheel assembly. The first and second wheels may be movable between a first position having the first wheel forward of the second wheel and a second position having the second wheel forward of the first wheel. The first wheel may be vertically movable around the second wheel between the first and second positions. The first and second wheels may be evenly spaced from a pivot axis of the first wheel assembly relative to the frame apparatus. The first and third wheels may each have axes of rotation that are independently movable relative to the frame apparatus and relative to each other.

Yet another aspect of the disclosure relates to a method of moving a multi-wheeled cart. The method may include providing a wheeled cart, with the cart having a frame, an axle axis extending through the frame, and a plurality of wheels rotatable relative to the axle axis, and moving the wheeled cart with at least one of the plurality of wheels contacting a ground surface, wherein contact between a first wheel of the plurality of wheels and an obstacle or recess in the ground surface causes a second wheel of the plurality of wheels to vertically move around the axle axis and over the first wheel.

The second wheel may also vertically move over the obstacle or recess. The method may also include providing a plurality of axes of rotation of the plurality of wheels, wherein the plurality of axes of rotation are parallel to the axle axis. A distance between the first and second wheel may remain constant as the second wheel vertically moves around the axle axis and over the first wheel. The axle axis may move vertically upward or downward relative to the ground surface as the second wheel moves vertically around the axle axis.

The above summary of the present invention is not intended to describe each embodiment or every implementation of the present invention. The Figures and the detailed description that follow more particularly exemplify one or more preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to cart apparatuses and methods that may be used to carry loads over uneven terrain. These apparatuses and methods may include wheel support assemblies on each side of a cart frame that can pivot relative to the frame. These wheel support assemblies may be referred to as "walking axles" since they may rotate to go over obstacles. The wheel support assemblies may each have multiple wheels with separate yet parallel axes of rotation. When a cart having these wheel support assemblies reaches an obstacle that causes one or more of the front wheels to be immobilized or blocked, forward movement of the cart may make the wheel support assembly of the blocked wheel rotate relative to the frame, thereby causing a wheel to the rear of the blocked wheel to move upward, over the blocked wheel, and over or onto the obstacle. Afterward, the blocked wheel is now behind the wheel that went over it, and the cart may the continue onward unabated. The spin and pivot movement of the wheel support assembly may thus enable the cart to pass over tall or deep obstacles without needing a heavy shock-absorbing track or suspension. Additionally, cart apparatuses disclosed herein may have a lower profile than conventional utility carts for easier loading and unloading and a lower center of gravity than conventional carts for more stability and user-friendliness without jeopardizing the quality of the cart.

When shorter obstacles (e.g., bumps, rocks, or logs) are encountered, the wheel support assemblies may rotate in the opposite direction, thereby allowing the front wheels to move upward and over the shorter obstacle without reversing the positions of the front and rear wheels. Thus, heavy loads such as downed game animals may be transported over uneven ground surfaces more conveniently and with less disruption to the pathing of the sportsman and/or disruption to the load being carried.

Aspects of the present disclosure relate to a frame having a handle structure at a proximal end of the frame and at least one cargo support portion positioned distal to the handle structure. As used herein, the "proximal" direction may generally refer to a direction toward a person or vehicle pushing or pulling the cart, and a "distal" direction may generally refer to a direction away from the person or vehicle. In some arrangements, the proximal direction is directed toward a handle portion of the cart, and the distal direction is directed away from the handle portion. Relative to an axle of the cart that connects a wheel support assembly to the frame, a proximal direction may be toward the handle portion and away from the axle, and a distal direction may be away from the handle portion and away from the axle. In some cases, the front of a cart may be the proximal end of the cart.

At least one wheel support assembly may pivot around an axle connected to the frame. "Pivoting" movement may refer to an object or part's ability to rotate relative to another object or part while simultaneously being connected to the other object or part. Wheel support assemblies of the present disclosure may therefore be described as being pivotable relative to a frame by being rotatable around an axle or axis that extends through the frame while also being secured to the frame in at least one direction. The movement of the wheel support assembly relative to the frame may be described as being propeller-like or fan-like, wherein a midsection of the wheel support assembly is pivotably connected to the frame and the ends of the wheel support assembly are configured to rotate around the pivotal connection similar to propeller or fan blades.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Figure 1A:
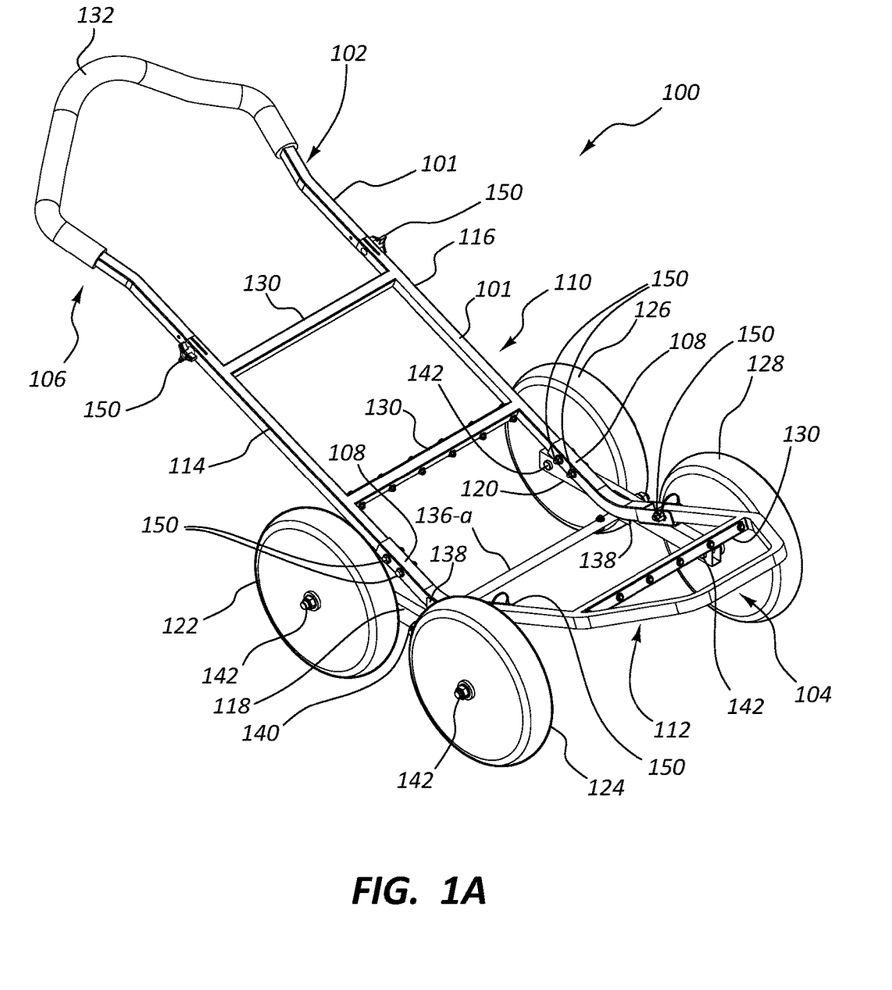
FIG. 1A is a perspective view of a cart according to an embodiment of the present disclosure.

Referring now to the figures in detail, FIG. 1A shows a perspective view of a cart 100 having multi-axis rotatable wheels according to the present disclosure. The cart 100 comprises a frame 101 having a first end 102 and a second end 104. A handle structure 106 is positioned at the first end 102, and wheel support portions 108 are positioned between the first and second ends 102, 104. A plurality of cargo support sections 110, 112 may be positioned along the frame 101 adjacent to the wheel support portions 108. The frame 101 has a left side 114 and a right side 116, with a left side wheel support assembly 118 pivotally attached to the left side 114 and a right side wheel support assembly 120 pivotally attached to the right side 116. Four wheels 122, 124, 126, 128 are positioned at the ends of the left and right side wheel support assemblies 118, 120. The wheel support assemblies 118, 120 may be referred to as "walking axles."

In some embodiments, the wheels 122, 124, 126, 128 may be referred to as a first wheel 122, a second wheel 124, a third wheel 126, and a fourth wheel 128. Also, the left and right sides 114, 116 may be alternatively referred to as being the right and left sides, respectively. Thus, the directional or numerical descriptions of these parts are for convenient reference to the figures, and are not limiting.

The frame 101 may be constructed of a plurality of tubular members. In some embodiments, the tubular members may have a hollow square, triangular, rectangular, circular, or oval cross-sections. The frame 101 may be constructed of a strong, durable, and rigid material, such as steel, aluminum, heavy duty polymers, and related materials. The frame 101 may comprise a single integral structure, or portions of the frame 101 may be disconnected or disassembled from other portions. For example, the first end 102 and/or second end 104 of the frame 101 may be detached or disconnected from the wheel support portions 108. In some arrangements, the frame 101 may fold or collapse. In one example, the frame 101 may fold at a pivot location positioned between the first and second ends 102, 104, such as at the wheel support portions 108. The wheel support assemblies 118, 120 may also be detachable from the frame 101. Folding, collapsing, and/or disassembling the frame 101 may improve the portability of the cart 100 and may allow users to store and pack the frame 101 more easily.

The first end 102 may extend farther from the wheel support portions 108 of the frame 101 than the second end 104. This may allow the handle structure 106 to be positioned at a comfortable height for use by a person pulling or pushing the cart 100. A higher handle structure 106 may also provide more leverage for lifting a load supported by the second end 104 when the wheels 122, 124, 126, 128 are on a ground surface. A high handle structure 106 may also reduce the chance that the frame 101 of the cart 100 will hit an obstacle before the wheels 122, 124, 126, 128. A load may be supported by the cargo support sections 110, 112 on the first and second ends 102, 104 simultaneously or by one of the ends 102, 104 individually.

The second end 104 may extend from the wheel support portions 108 away from the first end 102. In some cases, the first and second ends 102, 104 may form a continuous, flat frame. In the embodiment of FIG. 1A, the first and second ends 102, 104 are positioned with an angle M (see FIG. 3A) between each other. The angle M between the ends 102, 104 may facilitate cupping around a load on the frame 101 to keep the load from sliding off of the second end 104 when the first end 102 is raised. The angle M may range from about 90 degrees to about 180 degrees.

Each of the first and second ends 102, 104 may comprise cross beam members 130. These members 130 may enhance the rigidity and stability of the frame 101 and keep the left and right sides 114, 116 from collapsing toward each other when a load is supported by the cargo support sections 110, 112. In some embodiments, a plurality of cross beam members 130 may be provided throughout the frame 101.

The handle structure 106 of the first end 104 may comprise one or more grippable portions 132. The grippable portions 132 may be part of the frame 101 or attached thereto. The grippable portions 132 may serve as handholds for a user to push or pull the cart 100 from the first end 104. The grippable portions 132 may extend at a vertical angle relative to the left and right sides 114, 116 of the frame 101 or may extend at a horizontal or lateral angle. The grippable portions 132 may also be configured to attach to a chain, rope, vehicle tow feature, or other tool or attachment point. Thus, the grippable portions 132 shown in the figures illustrate hand-held grip portions, but other types of grippable portions 132 may be used to allow retention of the cart 100 independent of a manual grip.

The cargo support sections 110, 112 may be positioned along the first and second ends 102, 104 of the frame 101. The cargo support sections 110, 112 may comprise one or more straps, nets, meshes, sheets (e.g., canvas sheets), or other devices spanning across the frame 101 and configured to keep loads from falling through the frame 101 in addition to the cross beam members 130. These types of devices and cross beam members 130 may be collectively and generically referred to as "load support elements." These straps may be anchored to the frame 101 and/or cross beam members 130 (e.g., by rivets or other fasteners) and/or they may slide along the frame 101 and/or cross beam members 130 to allow the user to control their positioning. In other embodiments, the load support elements may be affixed to the frame 101 on a top and/or bottom side of the frame 101, as needed. An element "affixed" to another element may be defined as being joined or attached to the other element in a way that prevents relative movement between each other in a permanent manner (i.e., damage or destructive force would be required to disconnect them from each other) or semi-permanent manner (i.e., damage or destructive force would have to be applied to a connecting means (e.g., a one-way clamp, rivet, zip-tie, glue, etc.) holding them together).

The wheel support portions 108 are positioned between the first and second ends 102, 104 of the frame 101. In some embodiments, a second end 104 may not be included, so the wheel support portions 108 may form the distal end of the cart 100. The first and second ends 102, 104 may be insertable into the wheel support portions 108 (or the wheel support portions 108 may be inserted into the frame members of the ends 102, 104) to facilitate assembling and disassembling the cart 100 for storage or transportation. Alternatively, one or both of the first and second ends 102, 104 may be integrated with (e.g., welded or otherwise permanently affixed) to the wheel support portions 108. The wheel support portions 108 may provide the angle M (see FIG. 3A) to the cart 100 between the first and second ends 102, 104 due to the wheel support portions 108 having a curved, angled, or otherwise transitioning shape.

The first and second ends 102, 104 may be constructed with telescoping parts that allow the first and second ends 102, 104 to lengthen or shorten if needed. For example, the handle structure 106 may be adjustable relative to the left and right sides 114, 116 of the frame 101. Pins and fasteners 150 throughout the cart apparatus 100 may facilitate various degrees of adjustment and control of the shape and size of the cart apparatus 100. The pins and fasteners 150 may be adjustable by hand (e.g., near the handle structure 106) or may be adjustable using tools.

Figure 2A:
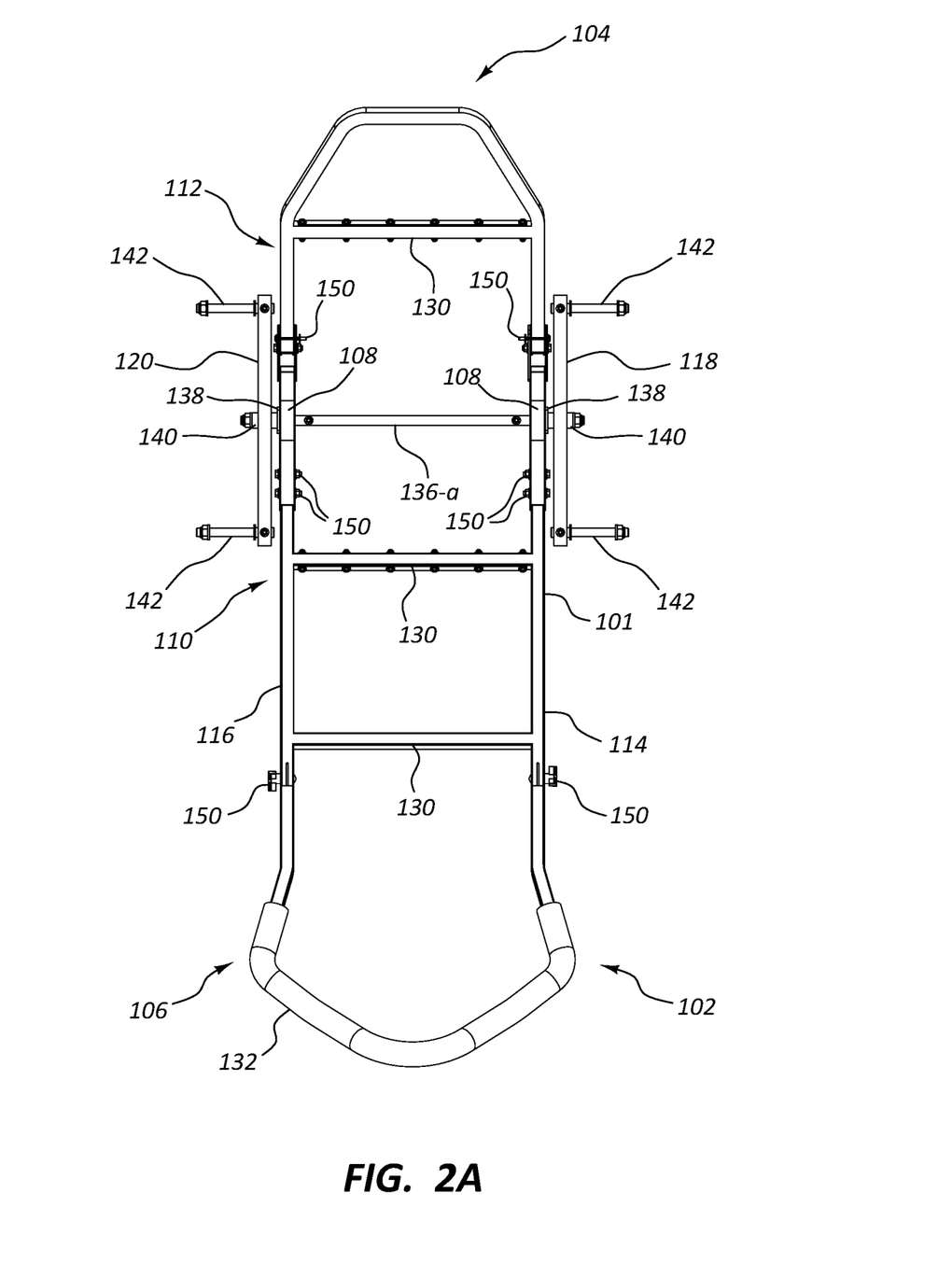
FIG. 2A is a top view of the cart of FIG. 1A with the wheels removed.
Figure 2B:
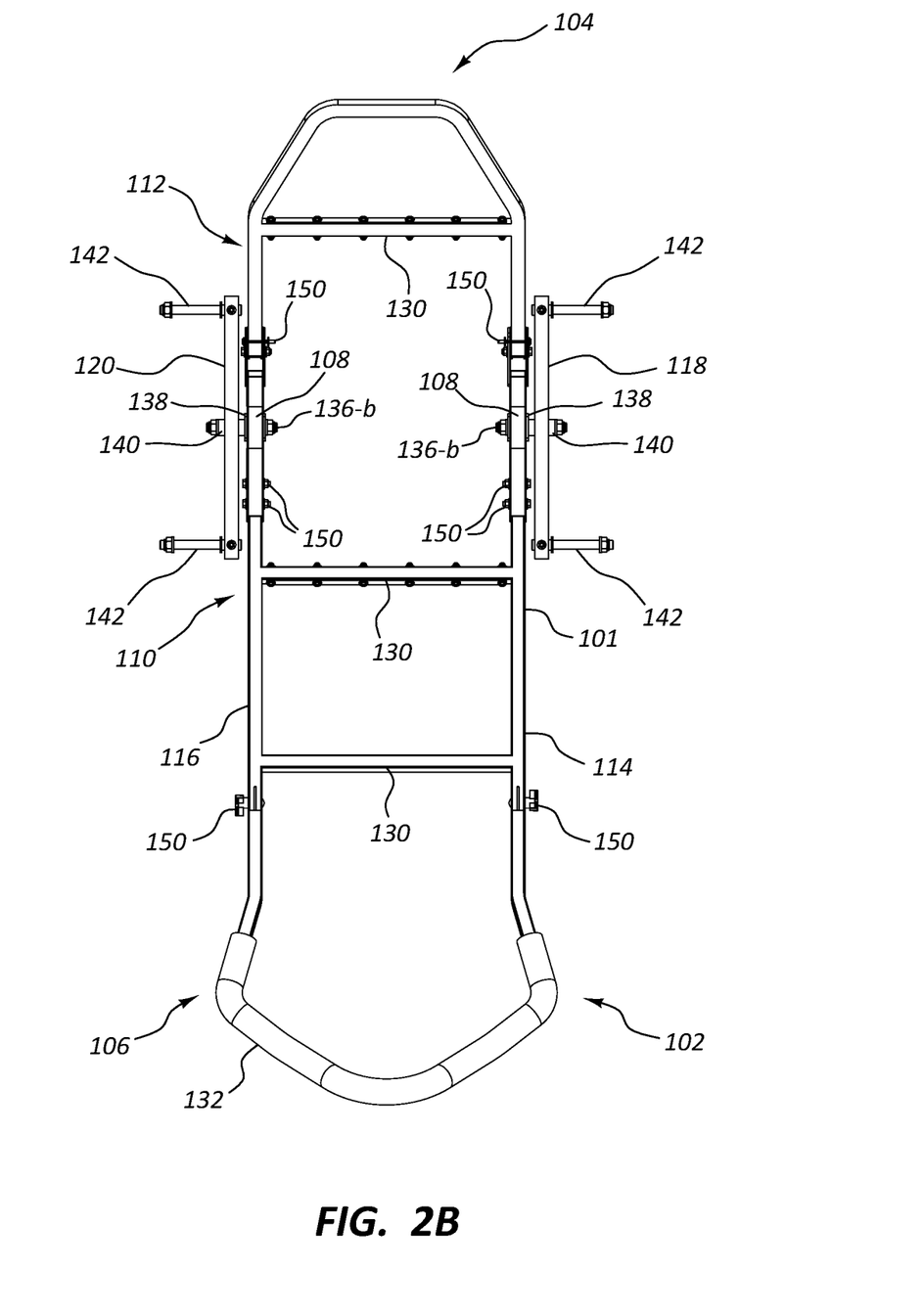
FIG. 2B is a top view of a cart similar to the cart of FIG. 1A that has an alternative axle arrangement.

One or more axles 136-a, 136-b may extend through the wheel support portions 108. See FIGS. 2A and 2B. Thus, the wheel support portions 108 may receive opposite ends of one axle 136-a or may receive two individual axles 136-b. An axle 136-a may define an axis of rotation for the wheel support assemblies 118, 120 relative to the frame 101. Individual axles 136-b may have coincident axes of rotation. In some embodiments the one or more axles 136-a, 136-b may extend through frame members of the wheel support portions 108, and in some embodiments they may extend through axle support portions 138 that offset them from the frame members of the wheel support portions 108.

Figure 1B:
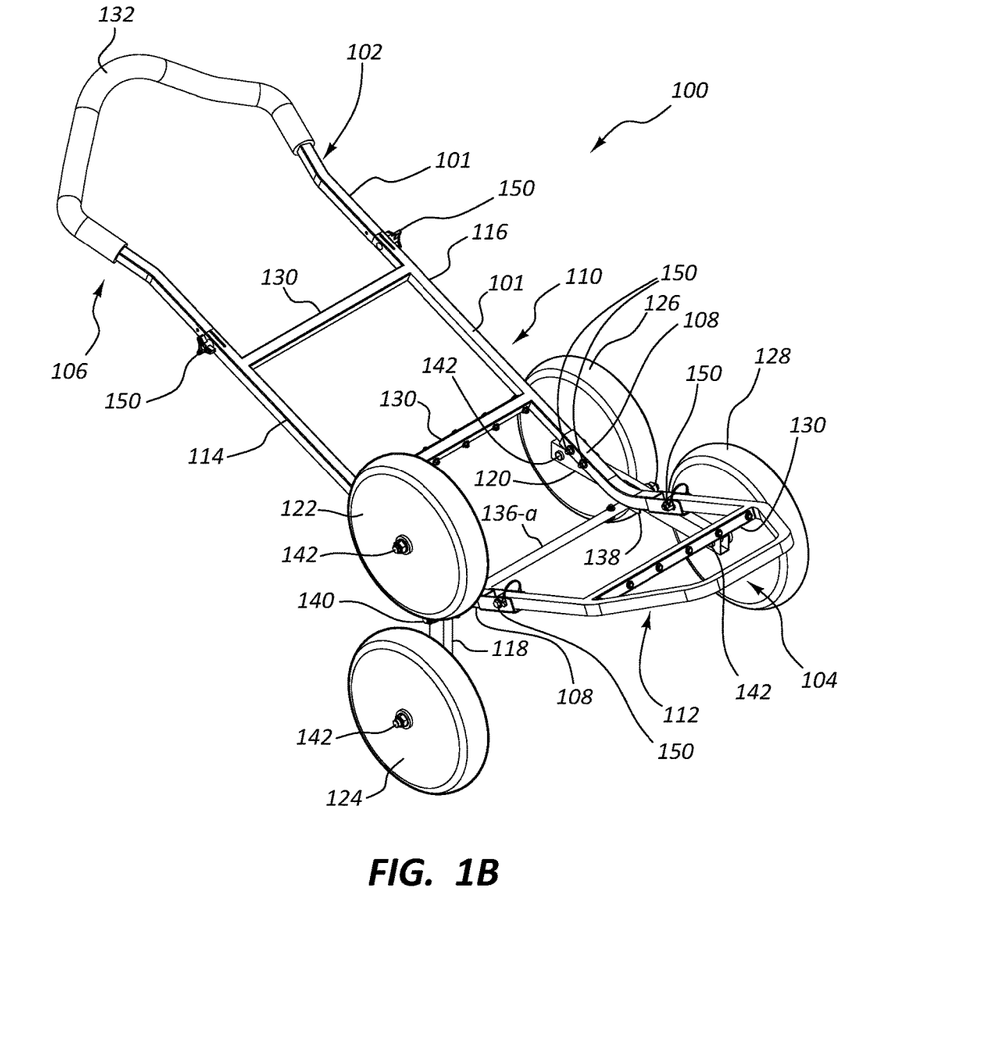
FIG. 1B is a perspective view of the cart of FIG. 1A showing a rotated wheel support assembly.

The wheel support assemblies 118, 120 may be configured to pivot around the axis of rotation defined by the one or more axles 136-a, 136-b. The wheel support assemblies 118, 120 may be connected to the frame 101 at frame pivot points 140. The frame pivot points 140 may be positioned centrally on the wheel support assemblies 118, 120 between the respective wheels 122, 124, 126, 128 of each of the wheel support assemblies 118, 120. Thus, the respective wheels 122, 124, 126, 128 may be evenly spaced from the frame pivot points 140. In some embodiments, the wheels 122, 124, 126, 128 may be unevenly spaced from the frame pivot points 140 due to the frame pivot points 140 being positioned along the wheel support assemblies 118, 120 away from their midpoints or due to the respective wheels 122, 124, 126, 128 being positioned at different distances from the centers of the wheel support assemblies 118, 120. An alternate pivoted position of wheel support assembly 118 is shown in FIG. 1B and shows how the wheel support assembly 118 may move relative to the frame 101 and relative to the other wheel support assembly 120. FIG. 1B also shows that the axes of the wheels 122, 124, 126, 128 may be parallel, but may not necessarily be coincident, when one of the wheel support assemblies is rotated relative to the other.

The wheel support assemblies 118, 120 may support two wheels 122, 124, 126, 128 each in a straight-line configuration that has the frame pivot point 140 positioned on the straight line. Alternatively, the wheel support assemblies 118, 120 may support more than two wheels in a straight line, such as two wheels on each side of a frame pivot point 140 or one wheel on one side of the frame pivot point 140 and two on the other. In another embodiment, the wheel support assemblies 118, 120 may support three wheels in a triangular configuration wherein the wheel support assemblies 118, 120 comprise three intersecting beams spaced at about 60-degree angles from each other. In yet another embodiment, wheels 122, 124, 126, 128 may be positioned between a wheel support assembly 118, 120 and the frame 101 and/or on the exterior side of the wheel support assembly (i.e., not facing the frame 101).

The wheels 122, 124, 126, 128 may be attached to the wheel support assemblies 118, 120 along wheel axles 142 that each extend through the wheels 122, 124, 126, 128 and connect the wheels to the wheel support assemblies. See FIGS. 2A and 2B. The wheel axles 142 may be parallel to the one or more axles 136-a, 136-b supporting the wheel support assemblies 118, 120. The wheel axles 142 may also be laterally or vertically offset from the one or more axles 136-a, 136-b. The wheel axles 142 may define axes of rotation for the wheels 122, 124, 126, 128. Thus, the wheels 122, 124, 126, 128 may each have independent axes of rotation. In some situations, some of the wheels 122, 124, 126, 128 may have coincident axes of rotation (e.g., wheels 122 and 126 or wheels 124 and 128 in FIG. 1A). The wheels 122, 124, 126, 128 may also be repositioned so that their axes of rotation are not coincident (e.g., FIG. 1B), but are parallel and offset from each other.

The wheels 122, 124, 126, 128 may be sized so that adjacent wheels 122, 124 or 126, 128 do not contact each other. The wheels 122, 124, 126, 128 may comprise a textured tread surface to improve grip with the ground surface. The wheels 122, 124, 126, 128 may be inflatable or solid. The wheels 122, 124, 126, 128 may also be removable from the wheel support assemblies 118, 120 to further facilitate travel and storage of the cart 100.

FIGS. 3A-3E, 4A-4D, and 5A-5D are side views of the cart 100 that illustrate how it may traverse obstacles or recesses that would otherwise stop movement of wheels (e.g., 122, 126) at the front of the of the cart 100. For the sake of illustration, these figures only show one wheel support assembly 118, but the other wheel support assembly 120 may operate identically. In some cases, both wheel support assemblies 118, 120 may rotate symmetrically. In other cases the wheel support assemblies 118, 120 may rotate asymmetrically or at offset phases of rotation. For example, if an obstacle B of FIG. 3A is only encountered by one side of the cart 100, only one of the wheel support assemblies 118, 120 may need to rotate to pass over it, and the other wheel support assembly may only need to rotate in response to the movement of the frame 101 that results from the rotation of the wheel support assembly passing over the obstacle B.

Figure 3A:
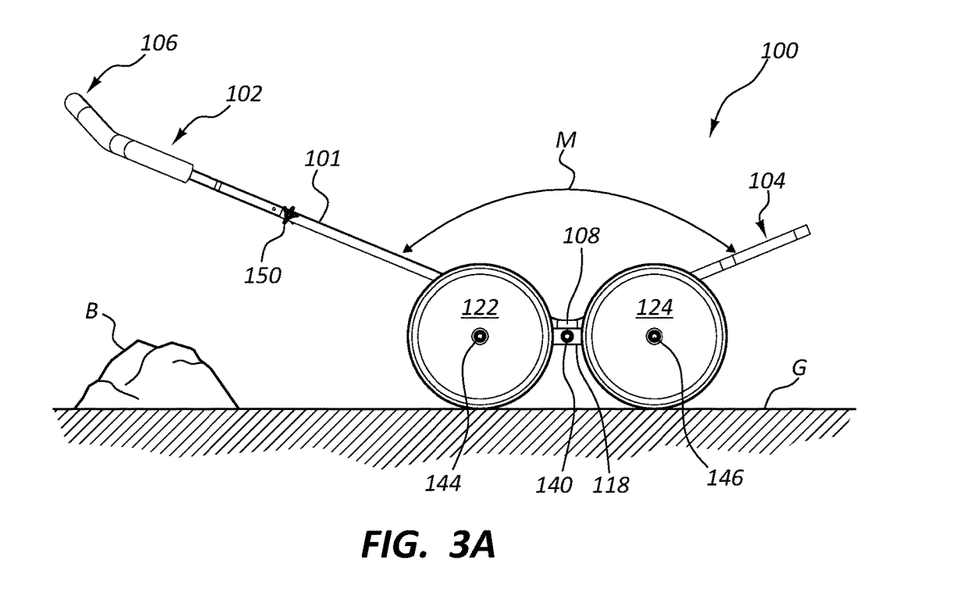
FIGS. 3A-3E illustrate movement of an embodiment of the cart over an obstacle.

FIG. 3A also shows how the design of the cart 100 facilitates a low center of gravity and a low ride height for a load. This eases loading a heavy animal or other cargo onto the cart 100 and makes the cart 100 more stable while loaded than other carts with higher centers of gravity.

FIG. 3A shows the cart 100 positioned on a ground surface G. The wheel support assembly 118 is parallel to the ground surface G and the wheels 122, 124 are both in contact with the ground surface G. For the sake of illustration, the ground surface G is shown as being flat and level, but the ground surface G may be irregular, sloped, etc., depending on the conditions in which the cart 100 is used. The cart 100 may be pulled proximally at the handle structure 106, and the wheels 122, 124 may roll on the ground surface G while the cart 100 supports a load on the frame 101. Wheel 122 is on a first end 144 of the wheel support assembly 118 and wheel 124 is at a second end 146 of the assembly 118.

Figure 3B:
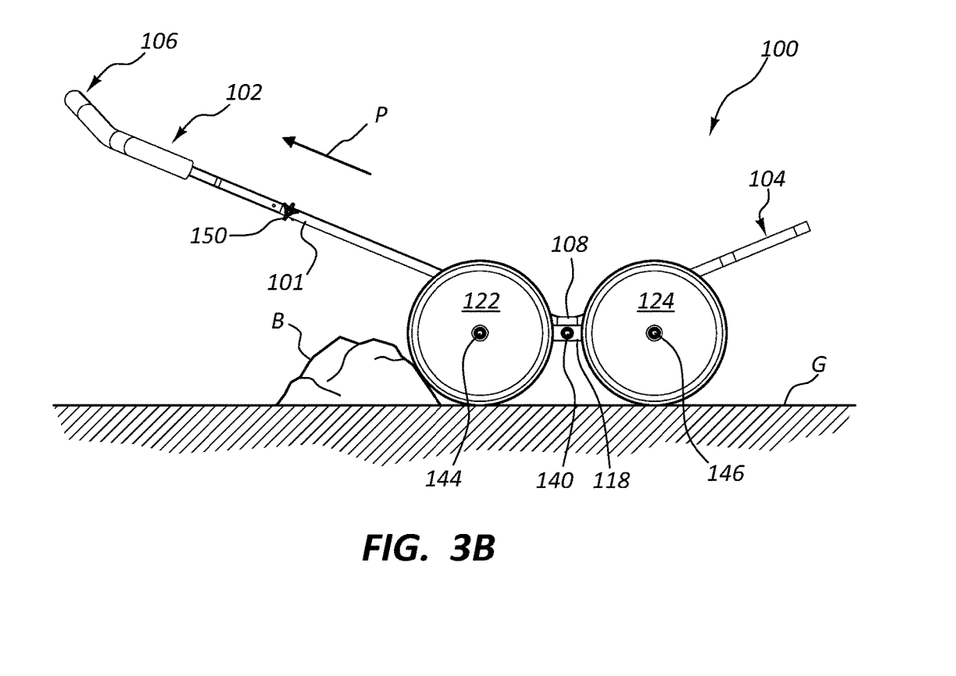
Figure 3C:
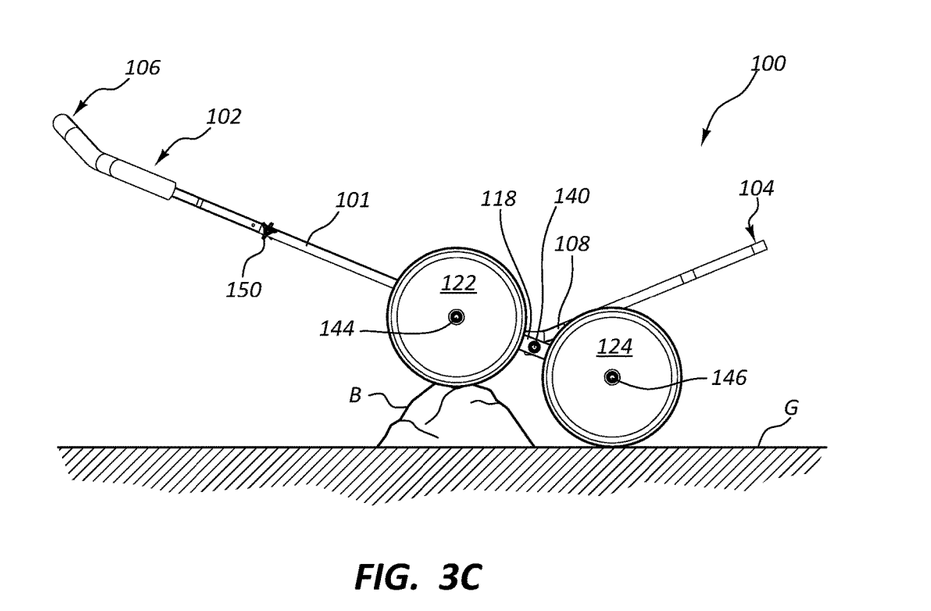
Figure 3D:
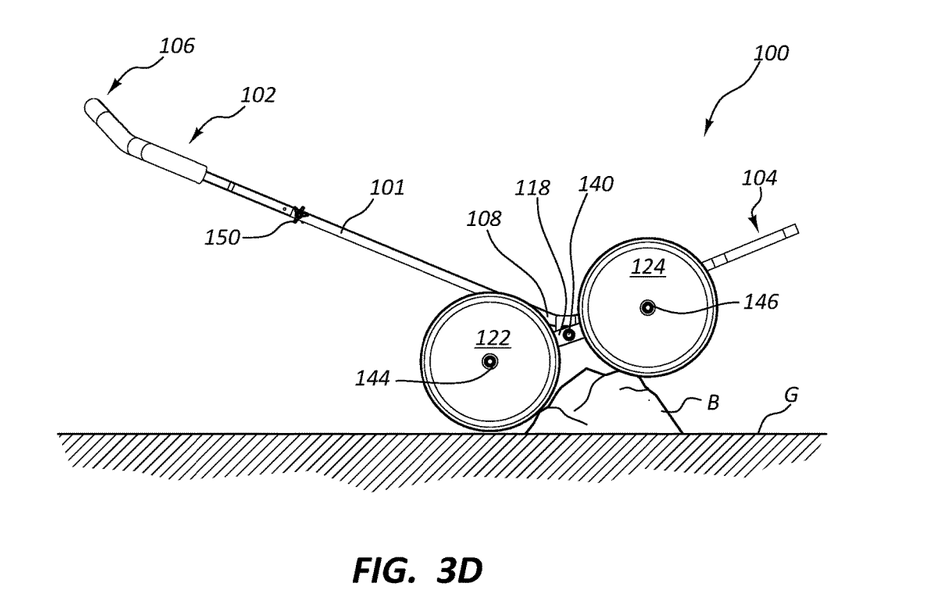
Figure 3E:
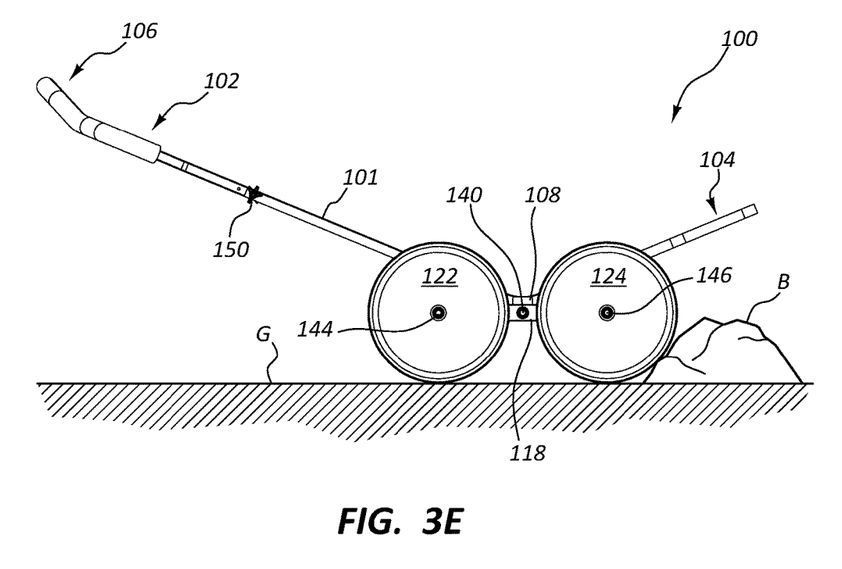

As the cart 100 approaches an obstacle B that is raised relative to the ground surface G, as shown in FIG. 3B, wheel 122 may roll over the obstacle by rotating the first end 144 of the wheel support assembly 118 upward, as shown in FIG. 3C, and wheel 124 may follow by similarly rolling over the obstacle B when it reaches the obstacle B, as shown in FIG. 3D. Rotating the first end 144 upward while wheel 124 is in contact with the ground surface G may cause the frame pivot point 140 to move upward as well, thereby causing the frame 101 to move up and over the obstacle B as the wheels 122, 124 roll over it. As the cart 100 continues to be pulled proximally, the wheels 112, 124 may return to the ground surface, as shown in FIG. 3E.

Figure 4A:
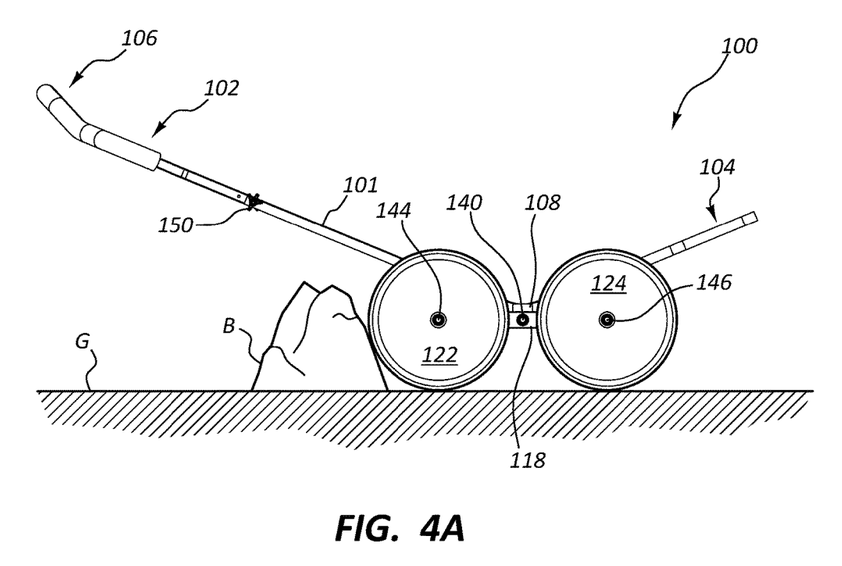
FIGS. 4A-4D illustrate movement of an embodiment of the cart over another type of obstacle.
Figure 4B:
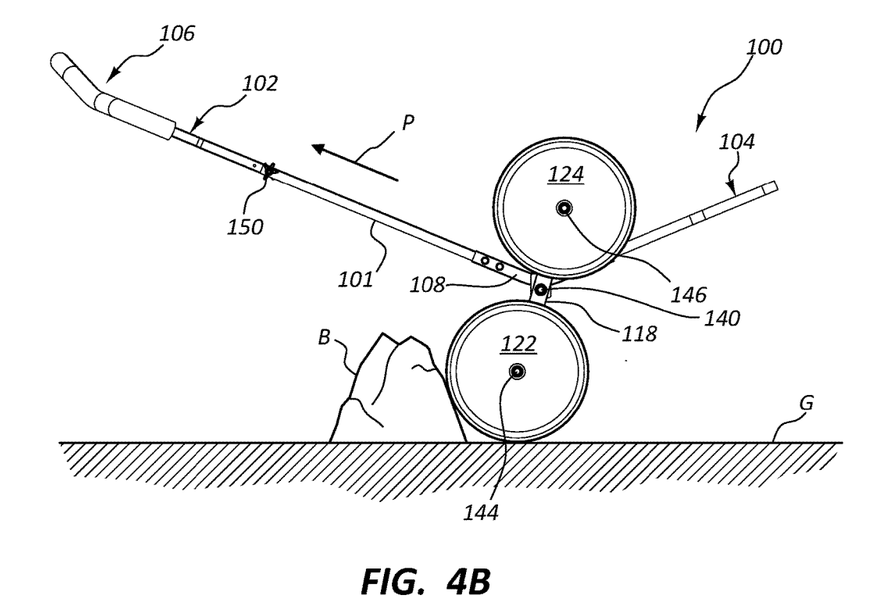
Figure 4C:
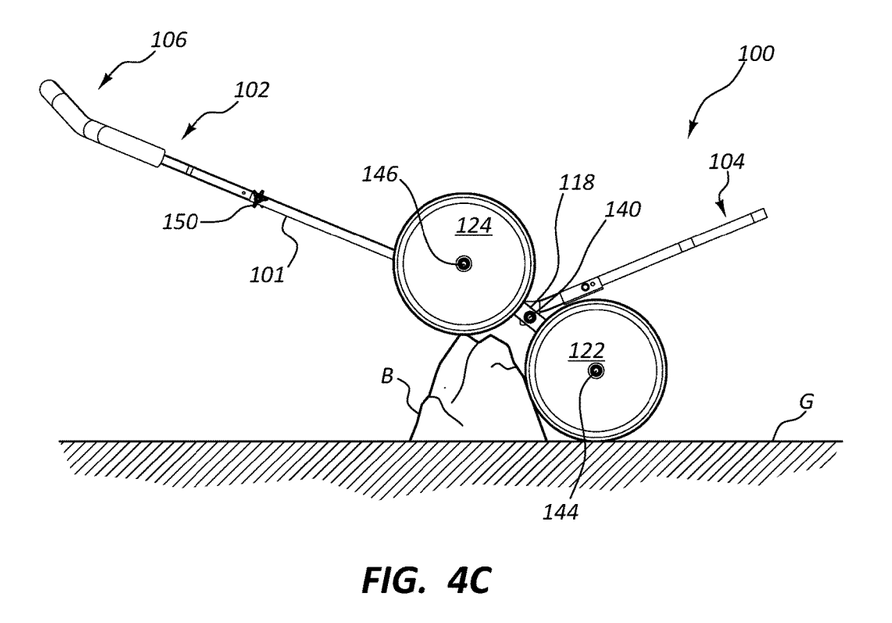
Figure 4D:
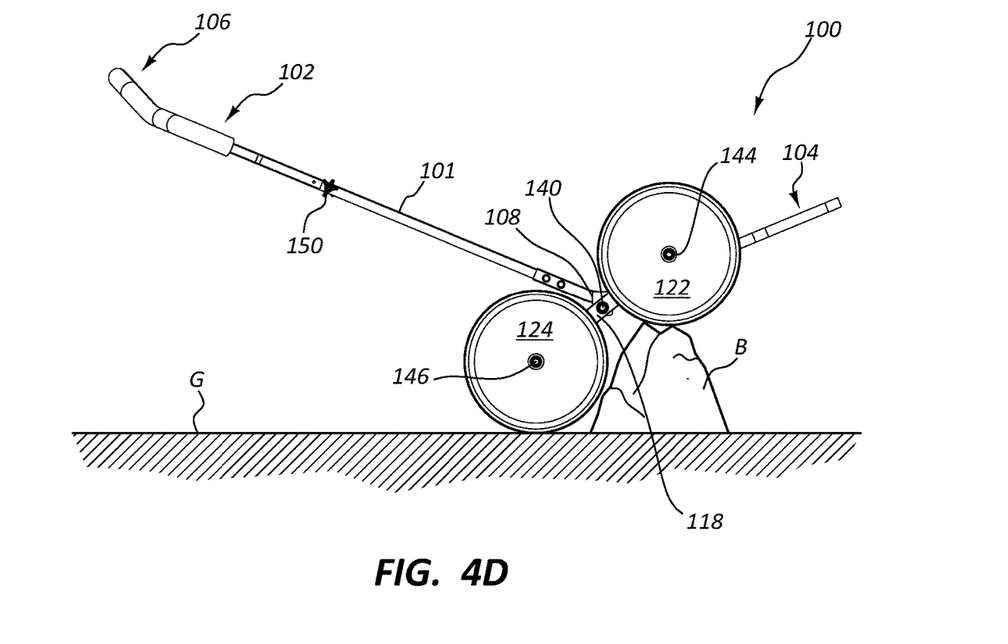

When wheel 122 of the cart 100 is unable to roll over the obstacle B or is immobilized by the obstacle B, as shown in FIG. 4A, pulling proximally (e.g., in direction P shown in FIG. 4B) or horizontally on the handle structure 106 may cause the wheel support assembly 118 to rotate upward at the second end 146, as shown in FIG. 4B. Simultaneously, the frame 101 may move upward at frame pivot point 140. The wheel support assembly 118 continues to rotate as the frame 101 is pulled, and wheel 124 moves vertically over wheel 122 and horizontally past wheel 122. See FIG. 4C. The wheel support assembly 118 rotates with the axle of wheel 122 as its axis of rotation. The wheel 124 may then move downward toward the ground surface G or obstacle B. As shown in FIG. 4D, wheel 124 may move back into contact with the ground surface G after rotating over the obstacle B. The wheel 124 may land on top of the obstacle B, but the cart 100 may usually then be drawn over the obstacle B by rolling the wheels 122, 124 at that point. Similarly, once reaching the positions of FIGS. 4C-4D, wheel 122 may be more easily rolled over the obstacle B due to the center of gravity of the load on the cart 100 (typically centered at about the frame pivot point 140) having shifted upward over the obstacle B and because wheel 124 may support the load as the first end 144 of the wheel support assembly 118 rotates upward over the obstacle B. Afterward, the cart 100 may return to the position shown in FIG. 4A (on the other side of the obstacle B) and continue moving forward. Throughout the movements from FIGS. 3A-4D, the wheels 122, 124 may remain at a constant distance from each other and at a constant distance from the frame pivot point 140.

Figure 5A:
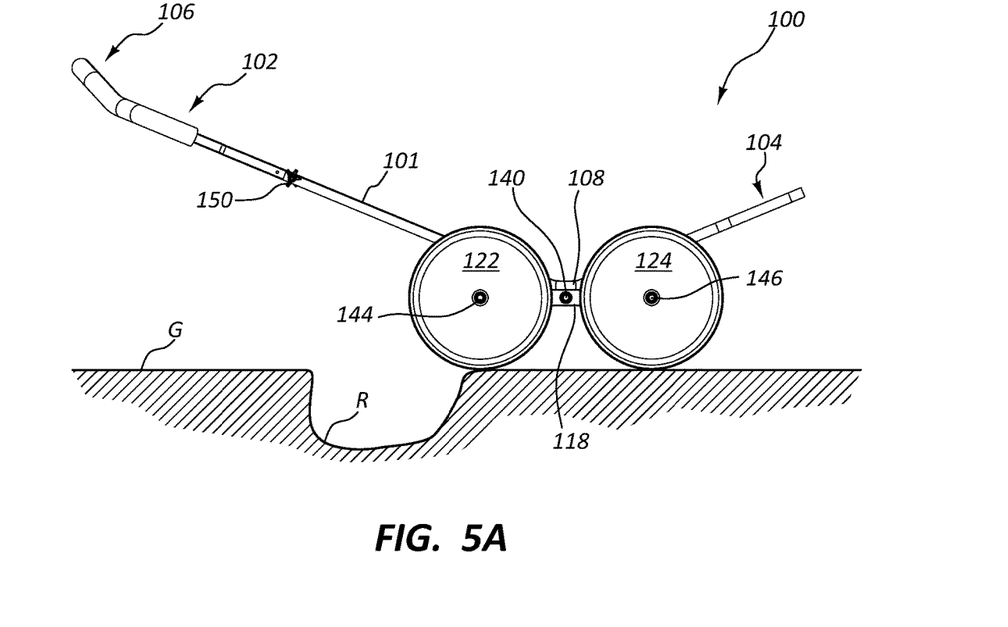
FIGS. 5A-5D illustrate movement of an embodiment of the cart over a recess.
Figure 5B:
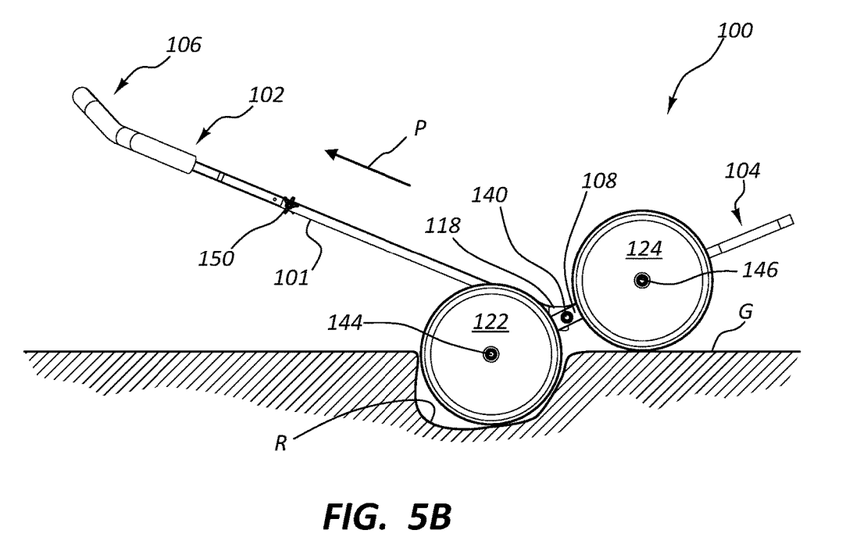
Figure 5C:
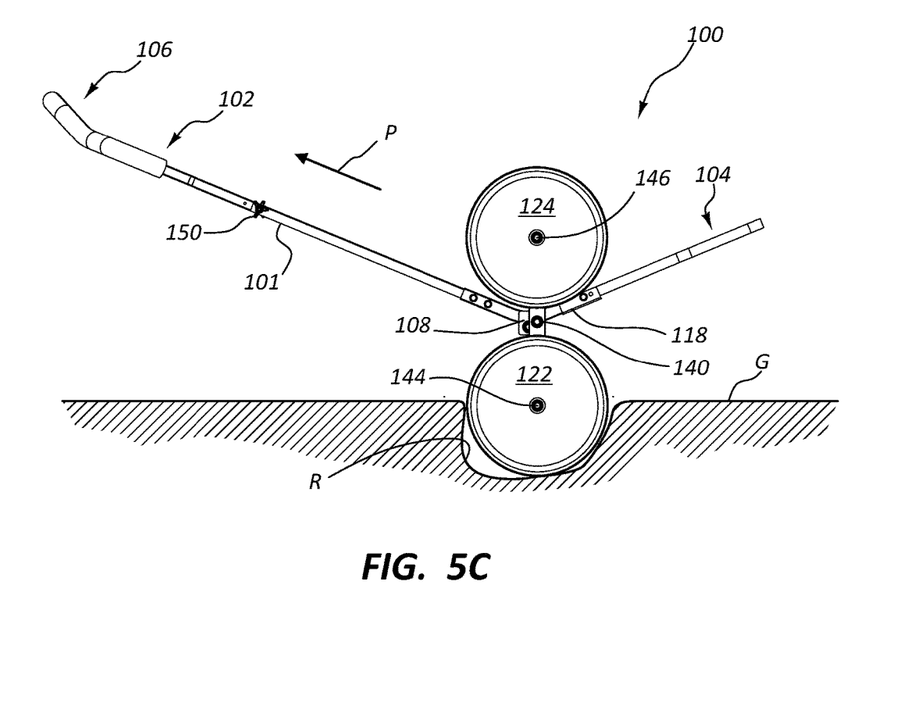
Figure 5D:
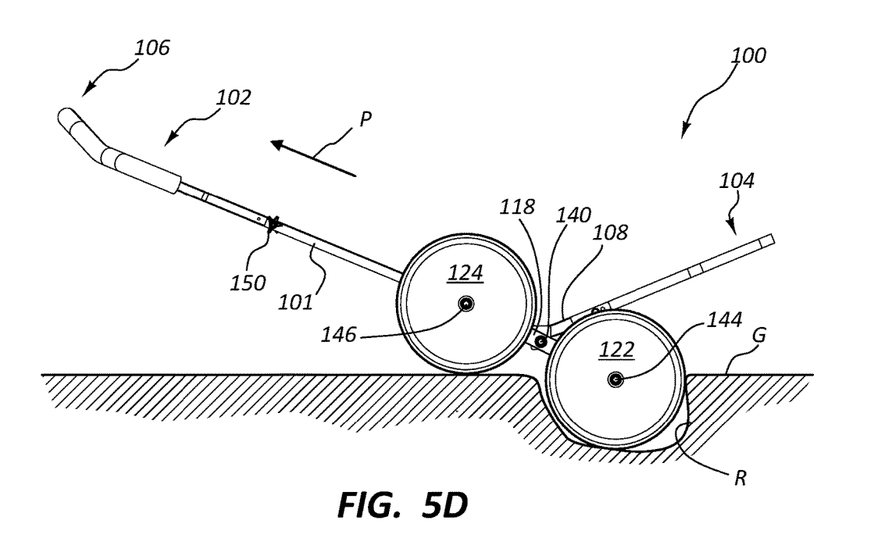

FIGS. 5A-5D illustrate how the cart 100 may traverse an obstacle that is a recess R relative to the ground surface G. The cart 100 begins on a ground surface G in FIG. 5A as it approaches the recess R. Wheel 122 may enter the recess R and may thereby be prevented from continuing to move forward, as shown in FIG. 5B. This may also cause the first end 144 of the wheel support assembly 118 to rotate downward relative to the frame pivot point 140. As the pulling force continues to act on the frame 101, the frame pivot point 140 may be drawn proximally and the wheel support assembly 118 may rotate around the axle of the wheel 122 at the first end 144. The wheel 124 may then move vertically over and horizontally toward and past wheel 122 until the second end 146 of the wheel support assembly 118 is past the first end 144 and wheel 124 comes back into contact with the ground surface G, as shown in FIGS. 5C and 5D. The center of gravity of the load is also moved over the recess R without wheel 122 moving. The wheel 122 may then roll out of the recess R and back to the ground surface G as the cart 100 is pulled proximally.

In view of the above, the cart 100 may facilitate transportation of a load over a variety of obstacles B or recesses R having various heights and depths. The precise dimensions of the cart 100 may be configured to overcome obstacles of specific heights or depths based on the diameters of the wheels 122, 124, the length of the wheel support assembly 118, and/or the positioning of the frame pivot point 140 relative to the frame 101 and the handle structure 106. For example, the cart 100 may be designed to easily overcome commonly-sized logs, rocks, roots, ditches, and other obstacles encountered in the field by having sufficiently-sized components. Additionally, the leap-frogging ability of the wheels may allow the cart 100 to move over obstacles that would normally be too tall or too deep for a cart with wheels positioned coaxial with the frame pivot point (e.g., 140).

While FIGS. 3A-5D illustrate movement of the cart 100 via pulling at the handle structure 106, it will be understood that the cart 100 may be pushed instead, in which case the sequence of movement of the wheel support assembly 118 may be reversed. For example, the cart 100 may move from the position of FIG. 5D to the position of FIG. 5C, then to the position of FIG. 5B by rotation of the wheel support assembly 118 in a direction opposite from the direction describe above. Thus, an aspect of the disclosure relates to a method of moving a multi-wheeled cart that includes providing a wheeled cart that has a frame, an axle axis extending through the frame, and a plurality of wheels rotatable relative to the axle axis, with the frame having a handle portion, and moving the wheeled cart with at least one of the plurality of wheels contacting a ground surface, wherein contact between a first wheel and an obstacle or recess in the ground surface causes a second wheel to vertically move around the axle axis and over the first wheel. Moving the wheeled cart in this method may comprise, for example, pushing, pulling, and/or lifting the cart.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including" and "having" come as used in the specification and claims shall have the same meaning as the term "comprising."

What is claimed is:

1. A cart configured to traverse uneven terrain, the cart comprising:
    a frame, the frame comprising a wheel support portion and an axle extending through the wheel support portion, the wheel support portion having a proximal end portion extending in a first direction from the axle and a distal end portion extending in a second direction from the axle, the proximal and distal end portions forming an angle, the angle having a vertex through which the axle extends, a handle structure extending from the proximal end portion and aligned with the first direction, and at least one cargo support section extending from the distal end portion of the wheel support portion and aligned with the second direction;
    at least one wheel support assembly configured to pivot around the axle;
    a first wheel and a second wheel, the first and second wheels being positioned directly opposite each other on the at least one wheel support assembly, the first and second wheels each being pivotable relative to the at least one wheel support assembly, the first wheel having a first axis of rotation offset from and parallel to the axle, the second wheel having a second axis of rotation offset from and parallel to the axle.

2. The cart of claim 1, wherein the frame comprises a first portion proximally extending from the axle and a second portion distally extending from the axle, the first and second portions extending from the axle at an angle relative to each other.

3. The cart of claim 1, wherein the respective axes of rotation of the first and second wheels extend through opposite ends of the at least one wheel support assembly.

4. The cart of claim 3, further comprising a second axle connecting the first wheel to the at least one wheel support assembly and a third axle connecting the second wheel to the at least one wheel support assembly.

5. The cart of claim 1, wherein the axle extends through a midsection of the at least one wheel support assembly.

6. The cart of claim 1, further comprising a plurality of load support elements extending across the frame at the at least one cargo support portion.

7. The cart of claim 1, wherein the at least one cargo support portion is positioned between the axle and the handle structure.

8. The cart of claim 1, wherein pivoting the at least one wheel support assembly relative to the axle moves the second wheel vertically over the first wheel.

9. The cart of claim 1, wherein the first and second axes of rotation are offset relative to each other.

10. A cart having multi-axis rotatable wheels, the cart comprising:
    a frame apparatus, the frame apparatus comprising a wheel support portion, at least one axle extending through the wheel support portion, at least one grippable portion, and a cargo support portion, the wheel support portion having a first end and a second end, wherein the first and second ends of the wheel support portion form an angle, the angle having a vertex through which the at least one axle extends, the at least one grippable portion being aligned with a first end of the wheel support portion, the cargo support portion being aligned with the second end of the wheel support portion;

a first wheel assembly pivotally attached to a first side of the frame apparatus, the first wheel assembly comprising a first end and a second end, a first wheel being attached to the first end of the first wheel assembly, a second wheel being attached to the second end of the first wheel assembly directly opposite the first wheel relative to a first pivot point of the first wheel assembly;

a second wheel assembly pivotally attached to a second side of the frame apparatus, the second wheel assembly comprising a first end and a second end, a third wheel being attached to the first end of the second wheel assembly, a fourth wheel being attached to the second end of the second wheel assembly directly opposite the third wheel relative to a second pivot point of the second wheel assembly.

11. The cart of claim 10, wherein the first wheel assembly is rotatable relative to the second wheel assembly.

12. The cart of claim 10, wherein the first and second wheels are movable between a first position having the first wheel forward of the second wheel and a second position having the second wheel forward of the first wheel.

13. The cart of claim 12, wherein the first wheel is vertically movable around the second wheel between the first and second positions.

14. The cart of claim 10, wherein the first and second wheels are evenly spaced from a pivot axis of the first wheel assembly relative to the frame apparatus.

15. The cart of claim 10, wherein the first and third wheels each have axes of rotation that are independently movable relative to the frame apparatus and relative to each other.

* * * * *